United States Patent

[11] 3,607,014

| [72] | Inventors | James O. Huml;<br>Gilbert S. Layne, both of Midland, Mich. |
|---|---|---|
| [21] | Appl. No. | 803,501 |
| [22] | Filed | Dec. 9, 1968<br>Division of Ser. No. 634,112, Apr. 27, 1967,<br>Patent No. 3,477,812 |
| [45] | Patented | Sept. 21, 1971 |
| [73] | Assignee | The Dow Chemical Company<br>Midland, Mich. |

[54] METHOD FOR PREPARING ALUMINUM NITRIDE AND METAL FLUORIDE SINGLE CRYSTALS
5 Claims, No Drawings

[52] U.S. Cl............................................. 23/88,
 23/92, 23/192, 23/208 R, 75/67, 75/68
[51] Int. Cl......................................... C01b 9/08,
 C01f 5/28, C01d 7/00
[50] Field of Search............................. 23/88, 192

[56] References Cited
UNITED STATES PATENTS

| 3,397,056 | 8/1968 | Layne et al............. | 75/68 |
| 3,477,812 | 11/1969 | Huml et al............. | 23/88 |

Primary Examiner—Edward Stern
Attorneys—Griswold & Burdick, C. Kenneth Bjork and L. S. Jowanovitz ABSTRACT: A process for producing aluminum nitride and metal fluoride single crystals either separately or simultaneously. The process comprises contacting a subvalent aluminum compound, i.e. where Al exhibits a valence of less than 3, in a gaseous state with a nitriding agent in a gaseous state while providing an inert surface on which the crystals can form. To prepare metal fluoride crystals, a subvalent aluminum fluoride compound in a gaseous state is contacted with a metal in a gaseous state under an inert atmosphere and providing an inert surface on which the metal fluoride crystals can form. To form the two crystals simultaneously the latter procedure is modified by carrying out the reaction in a nitriding atmosphere.

METHOD FOR PREPARING ALUMINUM NITRIDE AND METAL FLUORIDE SINGLE CRYSTALS

CROSS-REFERENCE TO RELATED APPLICATION

This is a division of application Ser. No. 634,112 filed Apr. 27, 1967 now U.S. Pat. No. 3,477,812.

BACKGROUND OF THE INVENTION

Single crystals are receiving considerable attention as strengthening components of structural compositions. They are usually bound together with a continuous media, termed a matrix. The elasticity of the matrix is usually greater than the crystal, thus the load is transmitted from crystal to crystal by the matrix. Examples of composite construction are filament wound pressure containers, glass-reinforced plastics, etc. If the length to diameter ratio of a crystal is greater than about 100, it acts as a continuous filament. The present invention concerns a novel method of making aluminum nitride and metal fluoride single crystals which can be employed as strengthening agents.

SUMMARY OF THE INVENTION

The present invention relates to a process for preparing single crystal compounds and more particularly to a process for preparing aluminum nitride and metal fluoride single crystals.

In the practice of the present invention the reactions are chosen such that a desired single crystal or a combination of different crystals can be prepared. Generally, when aluminum nitride crystals are to be prepared, a subvalent aluminum compound (i.e. aluminum having a valence of less than +3) is contacted while in a gaseous state with a gaseous nitriding compound to provide a gaseous reaction mass, while proving an inert surface in contact with said reaction mass upon which aluminum nitride single crystals are formed. Metal fluoride single crystals are formed by contacting a metal in a gaseous state with gaseous subvalent aluminum fluoride in an inert atmosphere to provide a gaseous reaction mass in the presence of an inert surface upon which metal fluoride single crystals are formed. SIngle crystals of aluminum nitride and metal fluoride can be simultaneously prepared by contacting aluminum fluoride in a gaseous state with a metal in gaseous state in the presence of a gaseous nitriding compound to provide a gaseous reaction mass in the presence of an inert surface where separable aluminum nitride and metal fluoride single crystals are formed. It is preferred to carry the method out in a reactor having a heat gradient along its length. The subvalent aluminum compound and nitriding agent or active metal are contacted in the zone of highest temperature and the crystals are condensed on the surface in the cooler portions of the reactor.

The process is exemplified by the following reactions.

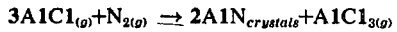

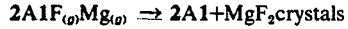

As designated herein a subvalent aluminum compound means an aluminum compound wherein the aluminum metal cation has a valence of less than +3.

A "metal" as used herein refers to the metallic form of a metal selected from the group I and group II elements of the periodic table.

PREFERRED EMBODIMENTS

In practice substantially pure aluminum nitride single crystals are prepared by contacting a gaseous subvalent aluminum compound with a gaseous nitriding compound while providing an inert surface upon which aluminum nitride crystals are condensed.

The temperature at which the process is run will depend on the particular aluminum compounds and nitriding compounds employed in the reaction. The temperature, however, should generally be maintained near to the lower temperature stability range of the subvalent aluminum compound employed and still sufficient to maintain the aluminum compound in a gaseous state. For example, when the initial reactants consist of AlCl and $N_2$, a temperature of greater than 1,000° C. is appropriate. It is generally preferred to employ a reactor having a heat gradient along its length. The subvalent aluminum compound and nitriding agent are contracted in the zone of highest temperature and aluminum nitride crystals are formed on the cooler inert surfaces of the reactor.

The reaction time is not critical and depends primarily upon the time required to insure a substantially complete admixture of the gaseous reactants. THe system is usually maintained at about atmospheric pressure; however, reduced pressures may be utilized in order to maintain the reactants in a gaseous state during the initial admixture. Usually a reaction temperature is chosen such that the process may be run at near atmospheric pressures.

Subvalent aluminum compounds which may be utilized herein are generally those which may be readily provided in a gaseous form at readily obtainable temperature ranges. Suitable subvalent aluminum compounds include, for example, AlVBr, AlClF, $AlCl_2$, $AlF_2$, AlOH, AlI, $Al_2S$, AlO, AlS, $Al_2O$ and mixtures thereof. AlCl, AlF and mixtures thereof are usually preferred in the operation of the present novel process because of the easily formed gaseous trivalent aluminum compound which is formed and which can be readily separated from the reaction zone.

Any nitrogen containing compounds capable of providing nitrogen atoms or molecules under the conditions of the novel process may be utilized as a nitriding agent. The nitriding compounds preferably should be reducing in character rather than oxidizing. Nitriding compounds which can be employed in the present novel method include, for example, $N_2$, hydrazine, cracked $NH_3$ and mixtures thereof; admixtures of nitriding compounds with nonreactive gases such as argon or hydrogen may be employed.

The relative concentration of the reactants is not critical, however, it is preferable to operate with an excess of nitriding compound over than stoichiometrically required to convert substantially all the subvalent aluminum compound to the aluminum nitride single crystals. It has been found that for especially fast reactions the gaseous reactants may be diluted with in inert gas such as, for example, argon or a normal valent aluminum halide compound, such as, for example, $AlCl_3$.

Metal fluoride single crystals, including aluminum fluoride, can be produced in a manner similar to that indicated hereinbefore for the preparation of aluminum nitride single crystals. Gaseous aluminum fluoride, in a subvalent state, is contacted with a zero valence metal, having a zero valence state, under an inert atmosphere while providing an inert surface in contact with the reaction mass and upon which the metal fluoride single crystals are condensed.

The system is usually maintained at about atmospheric pressure during the complete reaction time but lower than atmospheric pressure can be employed in order to assure that the reactions are initially completely in a gaseous state. As indicated hereinbefore in the process for preparing aluminum nitride crystals, an initial reaction temperature is usually selected so that the process may be run at or near atmospheric pressures.

Metals other than aluminum which may be utilized to form the corresponding metal fluoride crystals can be selected from the group I and group II metals of the periodic table, and mixtures thereof. As indicated hereinbefore, the metallic form of the metal is required in the operation of the present invention and magnesium is preferred in the actual operation of the present invention.

The relative concentrations of the initial reactants is not critical, and is dependent merely upon the amount of crystals to be formed. Stoichiometric amounts are usually employed in the actual practice of the present novel process.

The process involving the preparation of metal fluoride crystals should be run under an atmosphere which is inert to the reactants and metallic fluoride crystals formed. An atmosphere of argon or hydrogen is usually employed in the practice of the present invention. In addition, the collection surface must be maintained at a temperature below the melting point or sublimation point of the metal fluoride. Again a reactor having a heat gradient along its length is usually employed.

The individual processes as described hereinbefore can be modified so that separable and distinct aluminum nitride and metal fluoride crystals may be prepared simultaneously. The process steps are essentially the same as indicated herein for the preparation of metal fluoride crystals. In addition, a nitriding atmosphere is substituted for the inert atmosphere and when the process is carried out under the indicated temperatures and other reaction conditions, distinct and separable aluminum nitride and metal fluoride single crystals are formed.

Any material which is substantially inert to the reactants and reaction products may be employed to provide a surface upon which the crystals may be formed. Examples of suitable inert materials include titanium, diboride, graphite, refractory metal oxides and carbides and other like materials.

The single crystals formed by the method as defined herein generally range in diameter from about 1 to 15 microns, and generally have a length to diameter ratio of from about 500 to 2,500. The metal fluoride crystals such as, for example, $MgF_2$ crystals, are usually larger than the aluminum nitride crystals. Measurements of the tensile strength of the aluminum nitride crystals generally ranges from about 0.5 to about $4\times10^6$ p.s.i. while the metal fluoride crystals generally have a tensile strength of about $0.5\times10^6$ p.s.i. It is usually preferred to produce crystals having a length to width ratio of greater than 100 since such crystals find particular utility as strengthening components.

The following examples will facilitate a more complete understanding of the present invention and are included herein for illustrative purposes only and are not meant to limit the present invention thereto.

EXAMPLE 1

Aluminum nitride single crystals were prepared in the following manner. A subvalent gaseous aluminum sulfur compound was prepared by heating 8.3 grams of $Al_2S_3$ and 8 grams of aluminum metal in a titanium diboride crucible at from about 1,750° C. to 1,900° C. for 1.5 hours to produce gaseous $Al_2S$. The crucible was contained in a graphite muffle enclosed in and insulated from an $Al_2O_3$ refractory sleeve. The muffle was induction heated. Nitrogen was contacted with the gaseous $Al_2S$ compound. Needlelike crystals were produced on the surface of the titanium diboride cruicible. By X-ray diffraction techniques these needlelike crystals were identified as substantially pure AlN and were found to be in single crystal form

EXAMPLE 2

$Al_2O_3$ was substituted for the $Al_2S_3$ in example 1 and processed under essentially identical operating conditions. AlN crystals were again produced.

EXAMPLE 3

AlN crystals were prepared by heating 47.6 grams of $Al_4C_3$, 73.3 grams $CaCl_2$ and 4 grams of carbon in a graphite crucible to about 1,700° C. and maintained at this temperature for approximately 1 hour. Nitrogen was introduced as the nitriding agent. The apparent reaction scheme by which the crystals are produced by this reaction mixture is:

$$Al_4C_3 + 2CaCl_2 + C \rightarrow 4AlCl \uparrow + 2CaC_2$$

$$3AlCl_{(g)} + N_2 \rightarrow AlCl_3 \uparrow + 2AlN \text{ crystals}$$

EXAMPLE 4

$MgF_2$ and AlN single crystals were prepared simultaneously in the following manner. 150 grams of aluminum metal and 172.7 grams of $MgF_2$ were heated in a graphite cylinder which was insulated from a Pyrex sleeve. A mixture of argon and nitrogen was used as an atmosphere. The reaction mixture was heated at approximately 1,450° C. for about 4 hours and then cooled. Needle-shaped crystals were formed on the walls of the graphite cylinder X-ray diffraction analysis disclosed that substantially pure AlN single crystals and separate and distinct substantially pure $MgF_2$ single crystals were formed. The crystals were examined microscopically and substantially all had length to width ratios greater than 500 and most of them had ratios of greater than 2,500. The AlN crystals ranged from about 1 to 5 microns in diameter and had a tensile strength of from about 0.5 to about $4\times10^6$ p.s.i. The $MgF_2$ crystals were slightly larger in diameter. The process can be described by the following reactions:

$$2Al + MgF_2 \rightarrow 2AlF + Mg$$

$$2AlF_{(g)} + Mg_{(g)} + N_{2(g)} \rightarrow MgF_2 + 2AlN \text{ (both single crystal crystals)}$$

Various modifications may be made in the present invention without departing from the spirit or scope thereof, for it is understood that we limit ourselves only as defined in the appended claims.

1. A process for preparing aluminum nitride and metal fluoride single crystals which comprises:
   a. contacting a gaseous subvalent aluminum fluoride compound with a gaseous metal selected from the group of group II metals of the periodic table and mixtures thereof and with a gaseous nitriding agent to provide a gaseous reaction mass;
   b. providing an inert surface in contact with said gaseous reaction mass; and
   c. condensing said gaseous reaction mass in the presence of said inert surface to form distinct aluminum nitride and distinct metal fluoride single crystals.

2. The process as defined in claim 1 wherein said aluminum fluoride compound is selected from the group consisting of AlF, $AlF_2$ and mixtures thereof.

3. The process as defined in claim 1 wherein said nitriding agent is selected from the group consisting of nitrogen, ammonia and hydrazine and mixtures thereof.

4. The process as defined in claim 1 wherein the gaseous metal consists of magnesium.

5. The process as defined in claim 1 wherein the single crystals have a length to diameter ratio greater than about 100.